(12) United States Patent
Suzuki

(10) Patent No.: US 9,026,234 B2
(45) Date of Patent: May 5, 2015

(54) INFORMATION PROCESSING APPARATUS AND INFORMATION PROCESSING METHOD

(71) Applicant: Canon Kabushiki Kaisha, Tokyo (JP)

(72) Inventor: Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/775,888

(22) Filed: Feb. 25, 2013

(65) Prior Publication Data

US 2013/0238128 A1    Sep. 12, 2013

(30) Foreign Application Priority Data

Mar. 9, 2012   (JP) ................... 2012-053679

(51) Int. Cl.
  *E05B 67/38*   (2006.01)
  *G01B 21/16*   (2006.01)
  *B25J 9/16*    (2006.01)

(52) U.S. Cl.
  CPC .............. *G01B 21/16* (2013.01); *B25J 9/1669* (2013.01); *B25J 9/1697* (2013.01); *G05B 2219/40053* (2013.01); *G05B 2219/45063* (2013.01); *B25J 9/1653* (2013.01)

(58) Field of Classification Search
  CPC .............................. G01B 21/16; B25J 9/1653
  USPC ..................... 702/94; 700/245–264
  See application file for complete search history.

(56) References Cited

U.S. PATENT DOCUMENTS 4,402,053 A * 8/1983 Kelley et al. ................. 700/259
4,412,293 A * 10/1983 Kelley et al. ................. 700/259
4,639,878 A * 1/1987 Day et al. ..................... 700/259
4,680,802 A * 7/1987 Nishida et al. ............... 382/141
4,831,549 A * 5/1989 Red et al. ..................... 700/254
4,942,539 A * 7/1990 McGee et al. ............... 700/253
4,985,846 A * 1/1991 Fallon .......................... 382/153

(Continued)

FOREIGN PATENT DOCUMENTS

CN   1980775 A    6/2009
EP   0389259 A2   9/1990

(Continued)

OTHER PUBLICATIONS

U.S. Appl. No. 113/865,917, filed Apr. 18, 2013. Applicant: Yasuo Katano.

(Continued)

*Primary Examiner* — Bhavesh V Amin
(74) *Attorney, Agent, or Firm* — Fitzpatrick, Cella, Harper & Scinto

(57) ABSTRACT

The position and orientation of a target object is obtained based on first measurement data obtained by a first sensor (first calculation). The position and orientation of the target object is obtained based on second measurement data obtained by a movable second sensor set in a position and orientation different from that of the first sensor (second calculation). When the position and orientation obtained by the first calculation and that obtained by the second calculation match each other, the position and orientation obtained by the first or second calculation or a position and orientation calculated from the position and orientation obtained by the first calculation and that obtained by the second calculation is output as the position and orientation of the target object.

20 Claims, 7 Drawing Sheets

(56) References Cited

U.S. PATENT DOCUMENTS

| | | | |
|---|---|---|---|
| 5,127,029 A | 6/1992 | Suzuki et al. | |
| 5,499,306 A * | 3/1996 | Sasaki et al. | 382/291 |
| 5,501,498 A | 3/1996 | Ulrich | |
| 5,513,299 A | 4/1996 | Terasaki et al. | |
| 5,943,476 A * | 8/1999 | Dougherty et al. | 700/259 |
| 6,101,455 A * | 8/2000 | Davis | 702/94 |
| 6,414,711 B2 * | 7/2002 | Arimatsu et al. | 348/86 |
| 6,658,962 B1 | 12/2003 | Rosheim | |
| 6,730,926 B2 * | 5/2004 | Boillot et al. | 250/559.23 |
| 6,757,422 B1 | 6/2004 | Suzuki et al. | |
| 6,856,341 B2 | 2/2005 | Suzuki | |
| 6,927,955 B2 | 8/2005 | Suzuki et al. | |
| 7,084,900 B1 * | 8/2006 | Watanabe et al. | 348/94 |
| 7,171,041 B2 * | 1/2007 | Watanabe et al. | 382/154 |
| 7,177,459 B1 * | 2/2007 | Watanabe et al. | 382/151 |
| 7,313,464 B1 | 12/2007 | Perreault et al. | |
| 7,589,747 B2 | 9/2009 | Matsui et al. | |
| 7,728,852 B2 | 6/2010 | Suzuki et al. | |
| 7,868,904 B2 | 1/2011 | Morita et al. | |
| 7,952,728 B2 | 5/2011 | Ibach et al. | |
| 7,957,583 B2 * | 6/2011 | Boca et al. | 382/154 |
| 7,965,904 B2 | 6/2011 | Kobayashi | |
| 7,966,094 B2 * | 6/2011 | Ban et al. | 700/260 |
| 8,265,403 B2 | 9/2012 | Abe et al. | |
| 8,295,975 B2 | 10/2012 | Arimatsu et al. | |
| 8,416,722 B2 | 4/2013 | Suzuki | |
| 2001/0010539 A1 | 8/2001 | Arimatsu et al. | |
| 2002/0101506 A1 | 8/2002 | Suzuki | |
| 2004/0103740 A1 | 6/2004 | Townsend et al. | |
| 2005/0234981 A1 | 10/2005 | Manousos et al. | |
| 2009/0310583 A1 | 12/2009 | Suzuki | |
| 2010/0004778 A1 | 1/2010 | Arimatsu et al. | |
| 2011/0164114 A1 | 7/2011 | Kobayashi et al. | |
| 2011/0222995 A1 | 9/2011 | Irie et al. | |
| 2012/0121135 A1 | 5/2012 | Kotake et al. | |
| 2013/0006423 A1 | 1/2013 | Ito et al. | |
| 2013/0151007 A1 | 6/2013 | Valpola et al. | |
| 2013/0184870 A1 | 7/2013 | Ota et al. | |

FOREIGN PATENT DOCUMENTS

| | | |
|---|---|---|
| JP | 2000-278716 A | 10/2000 |
| JP | 4226623 B | 2/2009 |
| JP | 2011-27623 A | 2/2011 |

OTHER PUBLICATIONS

U.S. Appl. No. 13/829,362, filed Mar. 14, 2013. Applicant: Motoharu Suzuki.

U.S. Appl. No. 13/784,684, filed Mar. 4, 2013. Applicant: Masahiro Suzuki.

U.S. Appl. No. 13/781,644, filed Feb. 28, 2013. Applicant: Masahiro Suzuki.

K.S. Arun, et al., "Least-Square Fitting of Two 3-D Point Sets", PAMI, vol. 9, No. 5 (1987).

U.S. Appl. No. 13/865,917, filed Apr. 18, 2013. Applicant: Yasuo Katano.

Jan. 6, 2015 Chinese Office Action in foreign counterpart application Chinese Patent Application No. 201310075115.2.

* cited by examiner

FIG. 2D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG. 2E

| LINE | TWO POINTS AT TWO ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

FIG. 2F

| SURFACE | SURROUNDING LINES | NORMAL (x,y,z) |
|---|---|---|
| S1 | L1, L2, L3, L4 | (0, 0, -1) |
| S2 | P1, P5, L8, L9 | (-0.88, 0.12, 0) |
| S3 | P2, P5, L6, L10 | (0, 1, 0) |
| S4 | P3, P6, L7, L11 | (0.88, 0.12, 0) |
| S5 | P4, P7, L8, L12 | (0, -1, 0) |
| S6 | P9, P10, L11, L12 | (0, 0, 1) |

INFORMATION PROCESSING APPARATUS AND INFORMATION PROCESSING METHOD

BACKGROUND OF THE INVENTION

1. Field of the Invention

The present invention relates to a technique of obtaining the position and orientation of a target object.

2. Description of the Related Art

Along with recent development of robot technologies, robots are replacing humans to do complex tasks such as assembly of industrial products, which have been done by humans. A robot picks parts using an end effector such as a hand, and assembles them. Conventionally, parts to be picked are supplied using an apparatus called a parts feeder for supplying parts one by one in line, or supplied by heaping a plurality of parts in various orientations in a pallet (box). When the parts feeder is used, each part is supplied in a predetermined position and orientation, and the robot relatively easily picks it. However, it additionally costs to prepare the parts feeder. In some cases, different parts feeders need to be prepared in accordance with the shapes of parts. In contrast, heaping and supplying parts can avoid an increase in cost because parts are only placed in the pallet. Following a recent trend toward high-mix low-volume production, attention is being paid to heaped supply capable of quickly coping with various parts.

In a conventional technique disclosed in Japanese Patent No. 04226623 (to be referred to as patent literature 1 hereinafter), first, a camera installed above a pallet senses a plurality of target objects as a whole, and a two-dimensional position in the sensed image of them is obtained. Then, a sensor mounted on the hand portion of a robot is moved to a position near and above one target object. The sensor measures the position and orientation of the target object, and the robot hand grips the target object. The target object is measured in stages by a combination of the camera which senses the whole view and the sensor capable of detecting a position and orientation with high accuracy though the measurement range is narrow. If position and orientation measurement fails or gripping of a target object by the robot hand fails, this target object is excluded from the next detection targets, and the position and orientation measurement is executed again. The processing can be made efficient by excluding, from detection targets, a target object which is highly likely to be failed in measurement.

In the method disclosed in patent literature 1, if position and orientation measurement fails or gripping of a target object by the robot hand fails, this target object is excluded from the next detection targets, and the position and orientation measurement is executed again. At this time, position and orientation measurement failures are classified into two types. The first failure occurs when no target object can be detected and no position and orientation measurement result can be output. The second failure occurs when a position and orientation different from that of a target object is erroneously obtained and output as the measurement result. These two cases are regarded as failures in the sense that the position and orientation of a target object cannot be measured. However, patent literature 1 describes only the former failure, and does not mention the latter failure. Therefore, if the latter failure occurs in patent literature 1, it is not determined that the position and orientation measurement has failed, and the robot hand tries to grip a target object on the assumption that the target object exists in an erroneous position and orientation. In practice, the target object is placed in a position and orientation different from the measurement result, so the gripping by the robot hand fails. At this time, unnecessary processing including gripping and detection of a gripping failure occurs and decreases the efficiency.

SUMMARY OF THE INVENTION

The present invention has been made in consideration of the above problems, and provides a technique for obtaining the position and orientation of a target object with higher accuracy.

According to the first aspect of the present invention, there is provided an information processing apparatus comprising: a first calculation unit that calculates a first calculated position and orientation of a target object based on first measurement data obtained from a sensor in a first position and orientation; a second calculation unit that calculates a second calculated position and orientation of the target object based on second measurement data obtained from a sensor in a second position and orientation different from the first position and orientation; a determination unit that determines whether the first calculated position and orientation calculated by the first calculation unit and the second calculated position and orientation calculated by the second calculation unit match; and an output unit that, if the determination unit determines that the first calculated position and orientation and the second calculated position and orientation match, outputs, a position and orientation of the target object based on at least one of the first calculated position and orientation and the second calculated position and orientation.

According to the second aspect of the present invention, there is provided an information processing method to be performed by an information processing apparatus, comprising: a first calculation step of calculating a first calculated position and orientation of a target object based on first measurement data obtained by a sensor in a first position and orientation; a second calculation step of calculating a second calculated position and orientation of the target object based on second measurement data obtained by a sensor in a second position and orientation different from the first position and orientation; a determination step of determining whether the first calculated position and orientation calculated in the first calculation step and the second calculated position and orientation calculated in the second calculation step match; and an output step of, when the first calculated position and orientation and the second calculated position and orientation are determined to match, outputting, as the position and orientation of the target object, a position and orientation based on at least one of the first calculated position and orientation and the second calculated position and orientation.

Further features of the present invention will become apparent from the following description of embodiments with reference to the attached drawings.

BRIEF DESCRIPTION OF THE DRAWINGS

FIGS. 2A to 2F are views for explaining a three-dimensional geometric model;

DESCRIPTION OF THE EMBODIMENTS

Embodiments of the present invention will now be described with reference to the accompanying drawings.

Note that the embodiments to be explained below are examples of concretely practicing the present invention, and are detailed examples of an arrangement which falls within the scope of the claims.

First Embodiment

In a first embodiment, the three-dimensional position and orientation of a target object is measured using the first sensor which acquires (measures) two- or three-dimensional information of the target object, and the second sensor which is mounted on a robot and acquires (measures) two- or three-dimensional information of the target object. At this time, whether there is a match between the measurement results of the respective sensors is determined. If it is determined that these measurement results match each other, it is determined that these measurement results are correct, and the robot does work for the target object by using the measurement results. If it is determined that these measurement results do not match each other, the position of the robot hand is moved to perform measurement again. Accordingly, when the result of measurement using the second sensor differs from an actual position and orientation of the target object, it can be prevented to do work by the robot based on an erroneous measurement result. Since unnecessary processing including gripping and detection of a gripping failure does not occur, work by the robot can be made efficient.

Figure 1:
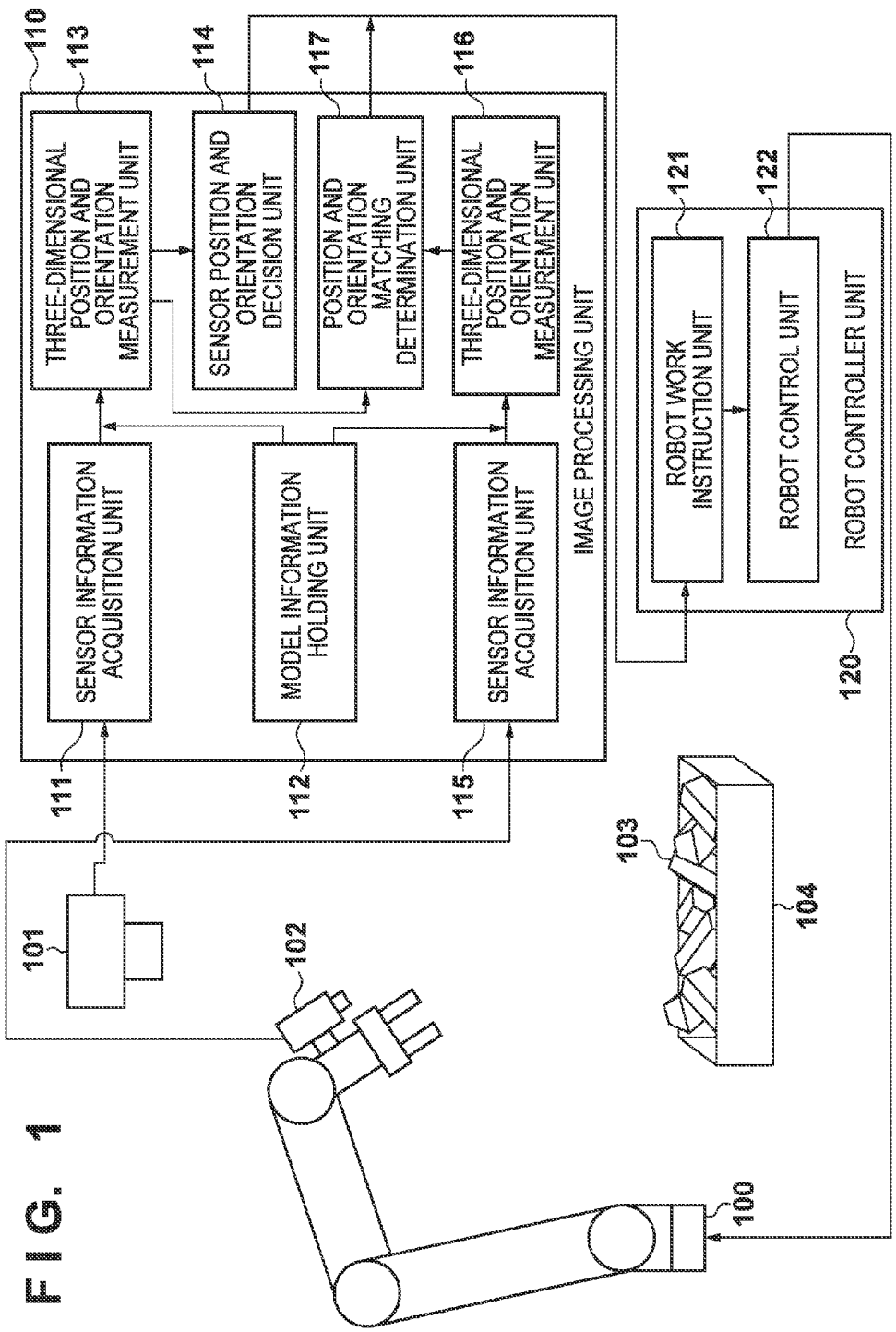
FIG. 1 is a view exemplifying the arrangement of a system.

First, the arrangement of a system according to the first embodiment will be exemplified with reference to FIG. 1.

A robot 100 is an articulated robot and operates in response to a control instruction from a robot controller unit 120. A hand serving as an end effector is mounted on the distal end of the robot 100 and can do work for a target object. In the embodiment, a hand with a chuck mechanism capable of gripping a target object is used as the end effector. The end effector may use a motor-driven hand or a suction pad for sucking a target object by air pressure.

Assume that calibration work has been performed in advance by a well-known technique for the position and orientation of a sensor unit 101, the positions and orbits of the robot 100 and the hand, and the relative position and orientation between the arm of the robot 100 and a sensor unit 102. This makes it possible to convert positions and orientations measured by three-dimensional position and orientation measurement units 113 and 116 to be described later into those in a work space coordinate system fixed in a space where a pallet 104 is placed. The robot 100 can also be controlled to move the hand to a position and orientation designated in the work space coordinate system.

The sensor unit 101 is a camera for sensing a two-dimensional image as two-dimensional information. The sensor unit 101 is fixed in the first position and orientation above the pallet 104, senses an image of heaped target objects 103, and outputs the sensed image to a sensor information acquisition unit 111. Although an image processing unit 110 processes the image sensed by the sensor unit 101 in the embodiment, the sensor unit 101 may incorporate an image processing mechanism to output an image processing result. When sensing the target objects 103 by the sensor unit 101, an illuminator (not shown) irradiates the target objects 103 with illumination light. The illuminator is arranged around the sensor unit 101 so that the sensor unit 101 can sense a two-dimensional image of the target objects 103 in a uniform illumination environment.

The sensor unit 102 includes a compact projector and a compact camera for sensing a two-dimensional image. The sensor unit 102 is fixed near the hand of the robot 100, and measures an object near the end effector in a position and orientation controllable (changeable) by controlling the angle of the joints of the robot 100. Assume that the relative positional relationship between the projector and camera of the sensor unit 102 has been obtained in advance by calibration. Although the image processing unit 110 processes an image sensed by the sensor unit 102 in the embodiment, the sensor unit 102 may incorporate an image processing mechanism to output an image processing result.

The projector of the sensor unit 102 irradiates the target object 103 with a predetermined pattern image (pattern light) (projects the pattern image). The camera of the sensor unit 102 senses the target object 103 on which the pattern image is projected, and outputs the sensed image to a sensor information acquisition unit 115. As the predetermined pattern image, an image such as a plurality of stripe patterns or a plurality of line patterns having different widths in a space encoding method is used. A two-dimensional pattern or random dot pattern is also available. The sensor unit 102 may include a diffraction grating, an illuminator, and a camera. In this case, the diffraction grating and illuminator project pattern light on a target object and the camera senses the pattern. The three-dimensional position and orientation measurement unit 116 uses the sensed image via the sensor information acquisition unit 115 to obtain a distance based on the principle of triangulation.

The target objects 103 are parts forming an industrial product. The robot 100 picks the target objects 103 and assembles them into a product. Various materials for the target objects are usable, including plastic, metal, and vinyl. The target objects 103 are heaped in the pallet 104 in various orientations.

The pallet 104 is a box for containing the target objects 103. Although the material of the pallet is not limited, the pallet is often made of plastic or paper. Further, the shape of the pallet is not limited, but is often a cube or rectangular parallelepiped for ease of manufacturing. Also, the size of the pallet is not limited, but is generally determined so that it falls within a range measurable by the sensor unit 101.

Next, the image processing unit 110 functioning as an information processing apparatus will be described.

The sensor information acquisition unit 111 acquires a sensed image of the target objects 103, that has been obtained by the sensor unit 101, and outputs the acquired sensed image to the three-dimensional position and orientation measurement unit 113.

A model information holding unit 112 holds model information used to measure the position and orientation of the target object 103 by the three-dimensional position and orientation measurement units 113 and 116. An example of the model information is the three-dimensional geometric model of the target object 103 based on three-dimensional CAD. Another example of the model information is a reference image model which is a set of reference images obtained when the actual target object 103 or a three-dimensional geometric model simulating the target object 103 is viewed from a plurality of predetermined viewpoints.

The three-dimensional geometric model is a CAD model itself which can be handled by three-dimensional CAD software, or a model obtained by converting a three-dimensional CAD model into a plurality of polygon elements used in the computer graphics field. The embodiment adopts a three-dimensional geometric model formed from polygon elements. The three-dimensional geometric model formed from polygon elements will be explained with reference to FIGS. 2A to 2F.

Figure 2A:
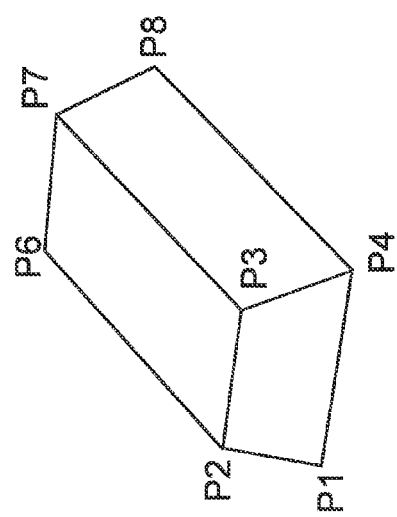
Figure 2B:
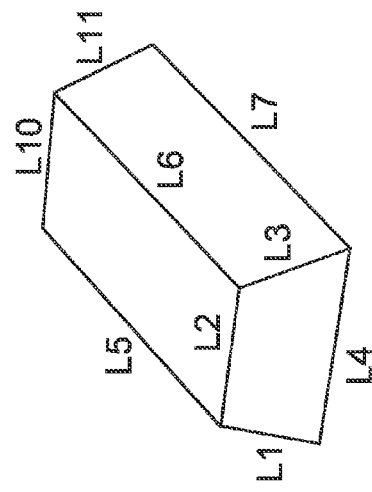
Figure 2C:
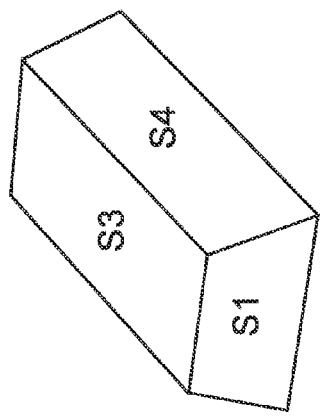

The three-dimensional geometric model formed from polygon elements includes building components such as points, lines, and surfaces as shown in FIGS. 2A to 2F. FIGS. 2A to 2C show the same three-dimensional geometric model.

For each vertex of the three-dimensional geometric model exemplified in FIG. 2A, model information of the three-dimensional geometric model formed from polygon elements manages the index of the vertex and the three-dimensional coordinate values of the vertex, as shown in FIG. 2D.

For each side of the three-dimensional geometric model exemplified in FIG. 2B, the model information manages the index of the side and the indices of vertices at the two ends of the side, as shown in FIG. 2E.

For each surface (polygon) of the three-dimensional geometric model exemplified in FIG. 2C, the model information manages the index of the polygon, the indices of the respective sides of the polygon, and the normal vector of the polygon, as shown in FIG. 2F.

A reference image model is data including a plurality of two-dimensional images. A reference image model based on an actually sensed image is created from images sensed with the camera from various directions by using the target object 103 as the center. A plurality of cameras may be arranged by setting up a scaffold for image sensing, the user may hold a camera to sense an image, or a camera mounted on the robot may sense an image while moving the robot. Although an image may be sensed by any method, the relative position and orientation between the camera and the target object 103 in image sensing is obtained and stored in association with the sensed image. When a plurality of cameras are arranged on the scaffold, the relative position and orientation can be obtained from the shape of the scaffold. When the user holds a camera, the relative position and orientation can be obtained from a position and orientation sensor by mounting the position and orientation sensor on the camera. When the camera mounted on the robot senses an image, the relative position and orientation can be obtained using control information of the robot.

Figure 3:
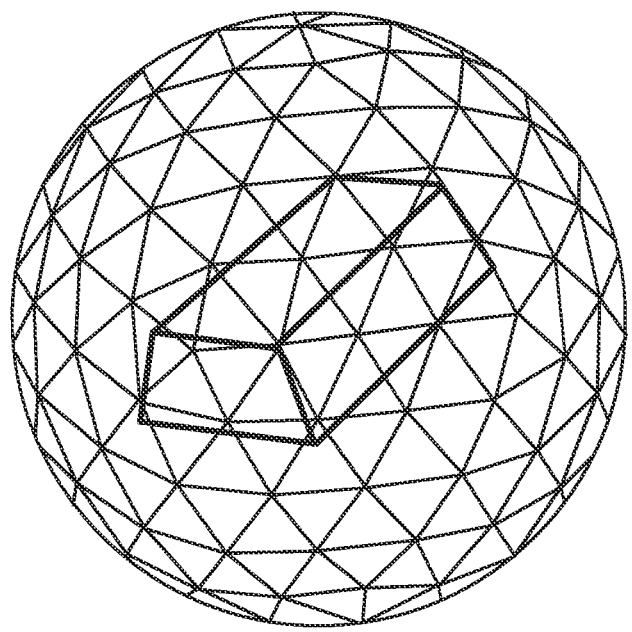
FIG. 3 is a view showing a CAD model and a geodesic sphere surrounding the CAD model.

As for a reference image model based on a three-dimensional geometric model simulating the target object 103, a geodesic sphere in which vertices have the same distance from the center of a CAD model is set, and an image viewed from each vertex of the geodesic sphere toward the center of the CAD model is used. The geodesic sphere has a plurality of vertices, and the distances between adjacent vertices are equal. A given vertex is set as a reference position, and a direction from which the CAD model is viewed is obtained based on the relative relationship with another vertex and is stored together with an image. FIG. 3 shows a CAD model and a geodesic sphere surrounding it. A set of images obtained by viewing the center from the respective vertices of the geodesic sphere is defined as a reference image model.

If it is already known that the target objects 103 are of only one type, model information of only this type is stored in the model information holding unit 112. If a plurality of types of target objects are dealt with, a plurality of types of model information are stored in the model information holding unit 112 and switched when used.

The three-dimensional position and orientation measurement unit 113 obtains a position and orientation of the target object 103 by using the sensed image of the target object 103 output from the sensor information acquisition unit 111, and model information held by the model information holding unit 112. The three-dimensional position and orientation measurement unit 113 then outputs the obtained position and orientation to a sensor position and orientation decision unit 114 and a position and orientation matching determination unit 117.

When a three-dimensional geometric model is used as model information, the position and orientation of the target object 103 is obtained by associating a line serving as a side of the three-dimensional geometric model with an edge component extracted from the sensed image output from the sensor information acquisition unit 111. In the embodiment, the coarse position and orientation of the three-dimensional geometric model is repeatedly corrected by an iterative operation so that the edge of the target object 103 coincides with a portion corresponding to the edge in the three-dimensional geometric model in the sensed image. The correction result is obtained as the position and orientation of the target object 103.

When a reference image model is used as model information, a reference image which best matches a sensed image is obtained by template matching using the reference image model as a template, and the position and orientation of the target object 103 is obtained based on a relative position and orientation associated with the obtained reference image.

Based on the position and orientation of the target object 103 obtained by the three-dimensional position and orientation measurement unit 113, the sensor position and orientation decision unit 114 obtains the second position and orientation for measuring the target object 103 by the second sensor unit 102. Then, the sensor position and orientation decision unit 114 outputs the obtained second position and orientation to a robot work instruction unit 121. The method of obtaining the second position and orientation will be described later.

The sensor information acquisition unit 115 acquires a sensed image of the target object 103 that has been obtained by the sensor unit 102, and outputs the acquired sensed image to the three-dimensional position and orientation measurement unit 116.

The three-dimensional position and orientation measurement unit 116 obtains a detailed position and orientation of the target object 103 by using the sensed image output from the sensor information acquisition unit 115, and model information held by the model information holding unit 112. The three-dimensional position and orientation measurement unit 116 outputs the obtained position and orientation to the position and orientation matching determination unit 117.

When a three-dimensional geometric model is used as model information, the position and orientation of the target object 103 is obtained by associating point group data of a surface extracted from the three-dimensional geometric model with a distance point group extracted from a sensed image output from the sensor information acquisition unit 115. By using a well-known technique such as a space encoding method or light-section method, the distance point group can be obtained from a sensed image of the target object 103 on which the pattern image is projected. To obtain the position and orientation of the target object 103 by using the obtained distance point group and the model information, the embodiment adopts the ICP (Iterative Closest Point) method. The position and orientation of the target object 103 is repeatedly corrected by an iterative operation. Note that the method of obtaining the position and orientation of the target object 103 is not limited to the ICP method.

When a reference image model is used as model information, a reference image which best matches a sensed image is obtained by template matching using the reference image model as a template, and the position and orientation of the target object 103 is obtained based on a relative position and orientation associated with the reference image.

The position and orientation matching determination unit 117 determines whether a position and orientation output from the three-dimensional position and orientation measurement unit 113 and that output from the three-dimensional position and orientation measurement unit 116 match each other. The position and orientation matching determination unit 117 then sends the determination result to the robot work instruction unit 121. More specifically, if the position and orientation matching determination unit 117 determines that these positions and orientations match each other, it sends, as the determination result to the robot work instruction unit 121, information representing the match and the position and orientation obtained by the three-dimensional position and orientation measurement unit 116. Alternatively, the position and orientation matching determination unit 117 may send, as the determination result to the robot work instruction unit 121, information representing the match, the position and orientation obtained by the three-dimensional position and orientation measurement unit 113, and the position and orientation obtained by the three-dimensional position and orientation measurement unit 116. If the position and orientation matching determination unit 117 determines that they do not match each other, it sends information representing the mismatch as the determination result to the robot work instruction unit 121. The determination processing by the position and orientation matching determination unit 117 will be described later.

Next, the robot controller unit 120 will be described.

The robot work instruction unit 121 generates an instruction signal for moving the hand. For example, if the robot work instruction unit 121 receives the second position and orientation from the sensor position and orientation decision unit 114, it generates an instruction signal to move the hand to the second position and orientation (moving destination). If the robot work instruction unit 121 receives a position and orientation output from the position and orientation matching determination unit 117, it generates an instruction signal to move the hand to a position and orientation in which the hand can grip or suck the target object 103 in the position and orientation, and to grip or suck the target object 103. If the robot work instruction unit 121 receives, from the position and orientation matching determination unit 117, information representing a mismatch, it generates an instruction signal to move the hand to a position and orientation different from the current one.

Note that the robot work operations are not limited to movement, gripping, and suction, and also include other work operations such as inspection of the appearance of the target object 103, as a matter of course. Furthermore, the robot is not limited to an articulated robot, and may be a movable machine capable of NC control.

Upon receiving an instruction signal from the robot work instruction unit 121, a robot control unit 122 controls the operation of the robot 100 in accordance with the instruction signal. The position and orientation of the hand of the robot 100 can therefore be moved in accordance with the instruction signal.

Figure 4:
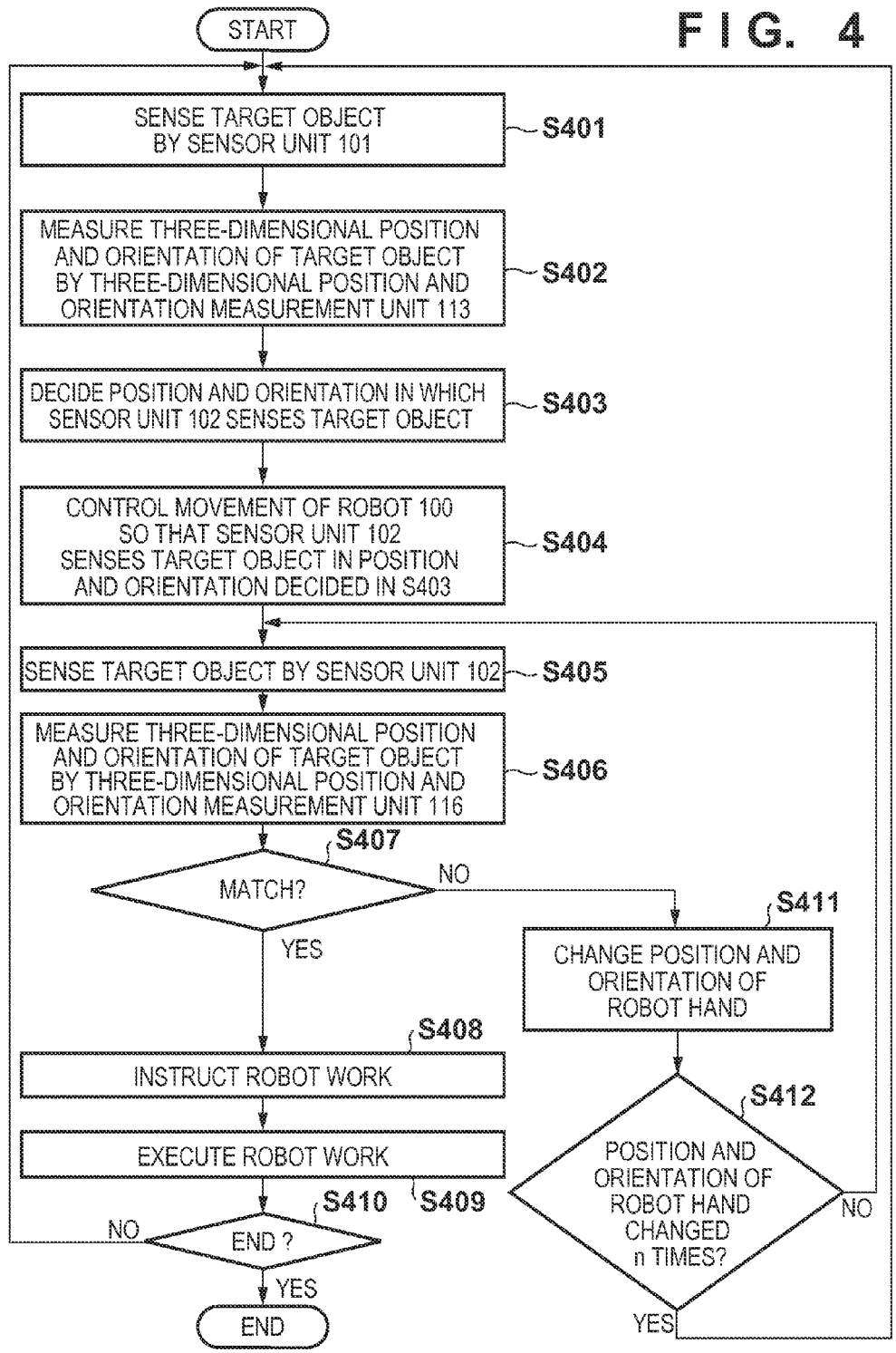
FIG. 4 is a flowchart showing the operation of the system.

The operation of the system according to the first embodiment will be described with reference to the flowchart of FIG. 4.

In step S401, the sensor unit 101 fixed above the pallet 104 in the first position and orientation senses an image of the target objects 103, and outputs the sensed image to the sensor information acquisition unit 111. Assume that the position and orientation of the sensor unit 101 has been obtained in advance by calibration. The sensor information acquisition unit 111 sends the sensed image of the target object 103, which has been received from the sensor unit 101, to the three-dimensional position and orientation measurement unit 113.

In step S402, the three-dimensional position and orientation measurement unit 113 measures the position and orientation of at least one target object 103' among the plurality of target objects 103 in the sensed image received from the sensor information acquisition unit 111. To obtain the position and orientation of the target object 103', the model information holding unit 112 outputs model information held in it, and the three-dimensional position and orientation measurement unit 113 performs matching between the image of the target objects 103 and the model information.

When a three-dimensional geometric model is used as the model information, the position and orientation of the target object 103' is obtained by associating a line serving as a side of the three-dimensional geometric model of the target object 103' with an edge component extracted from the sensed image output from the sensor information acquisition unit 111. In the embodiment, the coarse position and orientation (represented by a six-dimensional vector s) of the target object to be measured is repeatedly corrected by an iterative operation using the Gauss-Newton method, which is a kind of nonlinear optimization method, so that the three-dimensional geometric model is fitted in the sensed image. Note that the optimization method for obtaining the position and orientation of a target object is not limited the Gauss-Newton method.

Figure 5B:
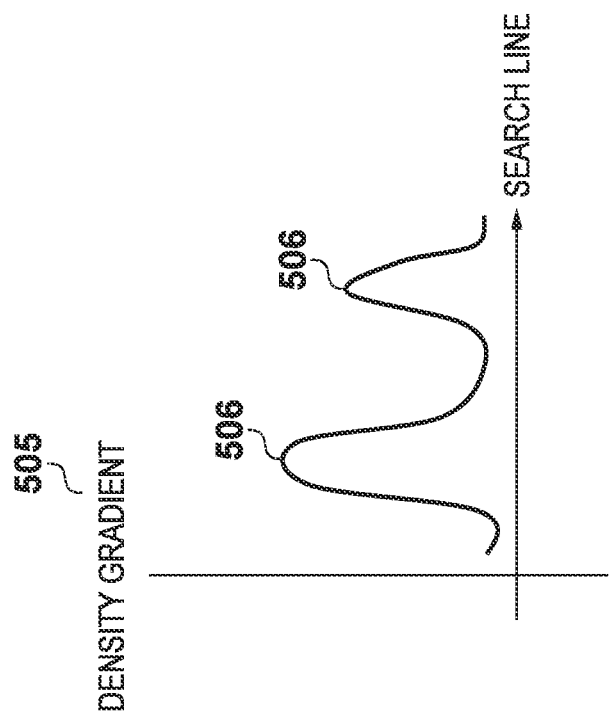
FIGS. 5A and 5B are views for explaining edge detection.
Figure 5A:
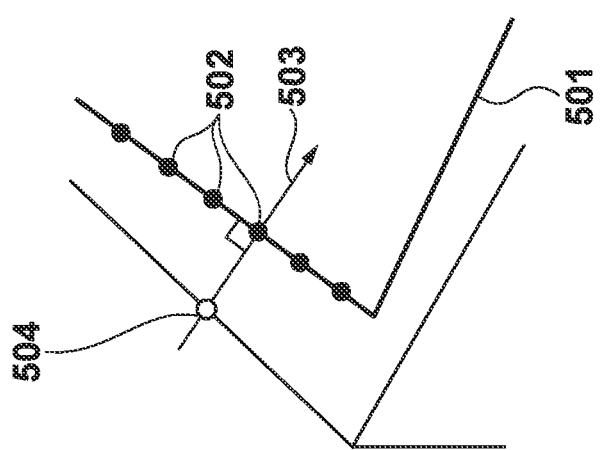

FIGS. 5A and 5B are views for explaining edge detection. A projection image, on the image, of each line segment forming the three-dimensional geometric model is calculated using the coarse position and orientation of the target object which has been obtained by some method (for example, template matching), and the calibrated internal parameters of the sensor unit 101. The projection image of a line segment is a line segment even on the image. Then, control points 502 are set on a projected line segment 501 at regular intervals on the image. For each control point 502, a one-dimensional edge 504 is detected in a direction 503 of the normal to the projected line segment 501 (FIG. 5A). Since an edge is detected as a local maximum of a density gradient 505 of a pixel value, a plurality of edges 506 may be detected, as shown in FIG. 5B. In the embodiment, all the detected edges are held.

To obtain the position and orientation of the target object by associating a line segment serving as a side of the three-dimensional geometric model with an edge component of the sensed image output from the sensor information acquisition unit 111, a coefficient matrix for calculating the position and orientation, and an error vector are calculated. Each element of the coefficient matrix is a first-order partial differential coefficient associated with each element of the position and orientation when the distance between a point and a straight line on the image is set as a function of the position and orientation. For an edge, the error vector is the signed distance between a projected line segment and a detected edge on the image. Derivation of the coefficient matrix will be described below.

Figure 6:
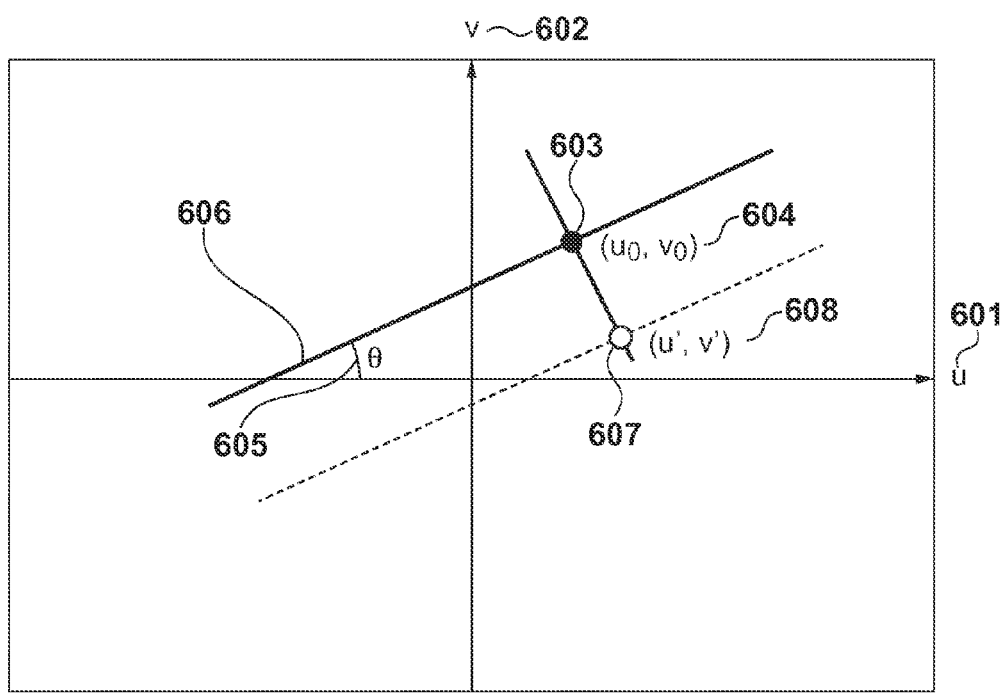
FIG. 6 is a graph for explaining the relationship between the projection image of a line segment and a detected edge.

FIG. 6 is a view for explaining the relationship between the projection image of a line segment and a detected edge. Referring to FIG. 6, a u-axis 601 represents the horizontal direction of the image and a v-axis 602 represents its vertical direction. (u0, v0) represents coordinates 604 of a given control point 603 (one of points which divide each projected line segment at regular intervals on the image) on the image. A slope θ 605 with respect to the u-axis 601 represents the slope, on the image, of the line segment to which the control point belongs. The slope θ 605 is calculated as the slope of a straight line obtained by projecting the three-dimensional coordinates of two ends of a line segment 606 on the image based on the six-dimensional vector s and connecting the coordinates of the two ends on the image. (sin θ, −cos θ) represents the normal vector of the line segment 606 on the image. (u', v') represents coordinates 608 of a point 607 corresponding to the control point 603 on the image. A point (u, v) on a straight line (a broken line in FIG. 6) which passes through the coordinates 608 (u', v') of the corresponding point 607 and has the slope θ 605 can be given by:

$$u \sin\theta - v \cos\theta = d$$

$$d = u' \sin\theta - v' \cos\theta \quad (1)$$

The position of the control point 603 on the image changes depending on the position and orientation of the target object. The position and orientation of the target object has six degrees of freedom. That is, s indicates a six-dimensional vector, and includes three elements representing the position of the target object and three elements representing its orientation. The three elements representing the orientation are expressed by, for example, Euler angles, or a three-dimensional vector, the direction of which represents a rotation axis passing through the origin, and the norm of which represents a rotation angle. The coordinates (u, v) of a point on the image that change depending on the position and orientation can be approximated by the first-order Taylor expansion near the coordinates 604 ($u_0$, $v_0$) according to expressions (2):

$$u \approx u_0 + \sum_{i=1}^{6} \frac{\partial u}{\partial s_i} \Delta s_i, \quad (2)$$

$$v \approx v_0 + \sum_{i=1}^{6} \frac{\partial v}{\partial s_i} \Delta s_i$$

where $\Delta s_i$ (i=1, 2, . . . , 6) is the infinitesimal change of each component of the six-dimensional vector s.

Assuming that the coarse position and orientation and the actual position and orientation are not so different, the position of the control point on the image, which is obtained by a correct six-dimensional vector s, can be assumed to exist on the straight line represented by equation (1). Substituting u and v approximated by expressions (2) into equation (1) yields equation (3):

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (3)$$

where r=$u_0$ sin θ−$v_0$ cos θ (constant).

Equation (3) is applicable to all edges having undergone association. Note that equation (3) may be applied to only some edges instead of all edges. Since equation (3) is an equation for the infinitesimal change $\Delta s_i$ (i=1, 2, . . . , 6) of each component of the six-dimensional vector s, linear simultaneous equations for $\Delta s_i$ can be set up as represented by equation (4):

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_2 \frac{\partial v}{\partial s_1} & \sin\theta_2 \frac{\partial u}{\partial s_2} - \cos\theta_2 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (4)$$

Here, equation (4) is rewritten into equation (5):

$$J\Delta s = E \quad (5)$$

To calculate the coefficient matrix J of the linear simultaneous equations, a partial differential coefficient is calculated. Based on equation (5), the correction value Δs of the position and orientation is obtained based on the least squares criterion using the generalized inverse matrix $(J^T \cdot J)^{-1} \cdot J^T$ of the matrix J. However, there are many outliers for edges due to a detection error and the like, so a robust estimation method to be described below is adopted. For an edge as an outlier, the value of the error vector on the right-hand side of equation (4) generally becomes large. From this, a small weight is given to information in which the absolute value of an error is large, and a large weight is given to information in which an error is small. The weights are given by Tukey functions as represented by equations (6):

$$w(z(d-r)) = \begin{cases} (1 - (z(d-r)/c_1)^2)^2 & |z(d-r)| \leq c_1 \\ 0 & |z(d-r)| > c_1 \end{cases} \quad (6)$$

$$w(e-q) = \begin{cases} (1 - ((e-q)/c_2)^2)^2 & |e-q| \leq c_2 \\ 0 & |e-q| > c_2 \end{cases}$$

where $c_1$ and $c_2$ are constants.

A function to give weights need not be a Tukey function, and the function is arbitrary, such as a Huber function, as long as the function gives a small weight to information in which an error is large, and a large weight to information in which an error is small. Let $w_i$ be a weight corresponding to each piece of measurement information (an edge or point group data). Then, a weight matrix W is defined as represented by equation (7):

$$W = \begin{bmatrix} w_1 & & & 0 \\ & w_2 & & \\ & & \ddots & \\ 0 & & & \end{bmatrix} \quad (7)$$

The weight matrix W is a square matrix in which all components except for diagonal components are 0, and weights $w_i$ are substituted into the diagonal components. By using the weight matrix W, equation (5) is rewritten into equation (8):

$$WJ\Delta s = WE \quad (8)$$

The correction value Δs is obtained by solving equation (8) as represented by equation (9):

$$\Delta s = (J^T W J)^{-1} J^T W E \qquad (9)$$

The coarse position and orientation is corrected by solving the following equation using the calculated position and orientation correction value Δs:

$$s \leftarrow s + \Delta s$$

Whether the six-dimensional vector s has converged is determined. If the six-dimensional vector has converged, the calculation ends; otherwise, the calculation is repeated. When the correction value Δs is almost 0, or the sum of squares of the error vector hardly changes before and after correction, it is determined that the six-dimensional vector s has converged. By repeating the calculation until the six-dimensional vector s converges, the position and orientation can be calculated.

The embodiment has described the use of the Gauss-Newton method as the optimization method. However, a Levenberg-Marquardt method which makes calculation more robust, or a steepest descent method as a simpler method may be used. Also, another nonlinear optimization calculation method such as a conjugate gradient method or ICCG method may be used.

When a reference image model is used as model information, a reference image which best matches a sensed image is obtained by template matching using the reference image model as a template, and the position and orientation of the target object is obtained based on a relative position and orientation associated with the reference image. Let T(i, j) be the luminance of the reference image, and I(i, j) be the luminance of the sensed image. Then, when the reference image is an image having m×n pixels, the degree R of coincidence between the reference image and the sensed image can be obtained according to equation (10):

$$R = \sum_{j=0}^{n-1} \sum_{i=0}^{m-1} (I(i, j) - T(i, j))^2 \qquad (10)$$

The three-dimensional position and orientation measurement unit 113 outputs the thus-obtained position and orientation of the target object 103' to the sensor position and orientation decision unit 114 and the position and orientation matching determination unit 117. Note that the position and orientation of the target object 103' obtained in step S402 is held in the internal memory (not shown) of the image processing unit 110 until it is determined in step S407 that a match occurs. Alternatively, the position and orientation of the target object 103' obtained in step S402 is held in the internal memory (not shown) of the image processing unit 110 until, for example, it is determined in step S412 that the position and orientation of the hand of the robot has been changed n times, and the process returns to step S401.

In step S403, based on the position and orientation of the target object 103' obtained in step S402, the sensor position and orientation decision unit 114 obtains the second position and orientation serving as a position and orientation in which the sensor unit 102 senses the target object 103'. Then, the sensor position and orientation decision unit 114 outputs the obtained second position and orientation to the robot work instruction unit 121.

Since the position and orientation of at least one target object 103 is obtained in step S402, the position and orientation of one target object 103' is assumed to have been obtained for descriptive convenience. Needless to say, the positions and orientations of the plurality of target objects 103 may have been obtained, and one of the target objects 103 may be selected as the target object 103'.

The second position and orientation is arbitrary as long as the sensor unit 102 can sense the target object 103'. However, it is desirable that the angle difference between a straight line connecting the camera of the sensor unit 101 with the target object 103' and the optical axis of the camera of the sensor unit 102 becomes equal to or larger than a predetermined angle. Since the sensor units 101 and 102 sense the same target object 103', it is better that the appearance of the target object 103' from the sensor unit 101 and that of the target object 103' from the sensor unit 102 are different. Generally in three-dimensional position and orientation measurement using a camera, the measurement accuracy in the direction of depth is lower than that in a direction toward the sensed image plane. For example, when the sensor unit 102 senses the target object 103' on a straight line connecting the sensor unit 101 with the target object 103', both the sensor units 101 and 102 view the target object 103' from the same direction, and cannot compensate for poor accuracy in the direction of depth. However, by changing the angle and measuring the target object 103' from different directions, the sensor units 101 and 102 can compensate for poor accuracy in the direction of depth. Since the sensor units 101 and 102 measure positions and orientations using different features (though partially) of the target object 103', the reliability of the matching determination increases.

In this fashion, the sensor units 101 and 102 measure the target object 103' from different directions. More specifically, the sensor unit 102 senses the target object 103' from a position on a straight line forming a predetermined angle with a straight line passing through the position of the camera of the sensor unit 101 and that of the target object 103'. This can be implemented by the following method.

First, positions and orientations within a distance range from the target object 103' in which the camera of the sensor unit 102 comes into focus on a straight line forming a predetermined angle with a straight line connecting the camera of the sensor unit 101 with the target object 103' by using the target object 103' as a center are set as candidate positions and orientations of the second position and orientation. Then, a candidate position and orientation closest to the current position and orientation of the sensor unit 102 is selected as the second position and orientation. Selecting the closest position can shorten the time taken to move the sensor unit 102, and thus shorten the tact time taken to pick parts. Note that the distance range where the camera comes into focus is determined by the shortest image sensing distance of the camera and its depth of field.

In step S404, the robot work instruction unit 121 generates an instruction signal to move the hand of the robot 100 to the second position and orientation received from the sensor position and orientation decision unit 114, and sends the generated instruction signal to the robot control unit 122. In accordance with the instruction signal, the robot control unit 122 controls the robot control unit 122 to move the hand to the second position and orientation. The sensor unit 102 can sense the target object 103' in the second position and orientation.

In step S405, the sensor unit 102 mounted on the robot 100 senses the target object 103' in the second position and orientation, and outputs the sensed image to the sensor information acquisition unit 115. The sensor information acquisition unit 115 sends the sensed image acquired from the sensor unit 102 to the three-dimensional position and orientation measurement unit 116.

In step S406, the three-dimensional position and orientation measurement unit 116 obtains the position and orientation of the target object 103' with high accuracy from the sensed image of the target object 103' acquired from the sensor information acquisition unit 115. To obtain the position and orientation of the target object 103', the model information holding unit 112 outputs model information held in it, and the three-dimensional position and orientation measurement unit 116 performs matching between the sensed image of the target object 103' and the model information.

When a three-dimensional geometric model is used as model information, the position and orientation of the target object is obtained by associating the point group of a surface extracted from the three-dimensional geometric model with a range image point group obtained from the sensed image output from the sensor information acquisition unit 115. A surface point group P of the three-dimensional geometric model is defined by:

$$P = \{p_1, p_2, \ldots, p_{N_p}\} \quad (11)$$

Also, a range image point group A is defined by:

$$A = \{a_1, a_2, \ldots, a_{N_a}\} \quad (12)$$

The surface point group P of the three-dimensional geometric model is converted to be aligned with the distance point group A. Assuming that a point of the point group A that has a shortest distance to each point pi of the point group P is represented by $b_i \in A$, an error function (13) can be defined by:

$$E(R, t) = \sum_{i=1}^{N_p} \|b_i - (Rp_i + t)\|^2 \quad (13)$$

where R is the orientation parameter, and t is the motion vector.

R and t which decrease the error function E are obtained to perform correction according to expression (14):

$$P \leftarrow RP + t \quad (14)$$

The method of obtaining R and t which decrease the error function E is described in K. S. Arun, T. S. Huang, and S. D. Blostein, "Least-Squares Fitting of Two 3-D Point Sets", PAMI, Vol. 9, No. 5, 1987.

Whether P has converged is determined. If P has converged, the correction calculation ends; otherwise, the correction calculation is repeatedly performed. For example, when P has hardly changed, it is determined that P has converged. The position and orientation can be calculated by repeating the correction calculation until P converges.

When a reference image model is used as model information, a reference image which best matches the sensed image is obtained by template matching using the reference image model as a template, and the position and orientation of the target object is obtained based on a relative position and orientation associated with the reference image. Let $T(i, j)$ be the distance value of the reference image, and $I(i, j)$ be the distance value of a range image obtained from the sensed image. Then, when the reference image is an image having m×n pixels, the degree R of coincidence between the reference image and the sensed image can be obtained according to equation (15):

$$R = \sum_{j=0}^{n-1} \sum_{i=0}^{m-1} (I(i, j) - T(i, j))^2 \quad (15)$$

Upon obtaining the position and orientation of the target object 103', the three-dimensional position and orientation measurement unit 116 outputs the obtained position and orientation to the position and orientation matching determination unit 117.

In step S407, the position and orientation matching determination unit 117 determines matching between the position and orientation of the target object 103' output from the three-dimensional position and orientation measurement unit 113, and that of the target object 103' output from the three-dimensional position and orientation measurement unit 116. The matching is determined based on whether there is a difference between the three-dimensional positions and orientations. If the position and orientation difference is smaller than a predetermined amount, the position and orientation matching determination unit 117 determines that these positions and orientations match each other. If the position and orientation difference is equal to or larger than the predetermined amount, the position and orientation matching determination unit 117 determines that they do not match each other.

A case in which the sensor unit 101 performs measurement once and the sensor unit 102 also performs measurement once will be explained. Let s be the position and orientation of the target object 103' output from the three-dimensional position and orientation measurement unit 113, p be the position and orientation of the target object 103' output from the three-dimensional position and orientation measurement unit 116, and T be a homogeneous transformation matrix for converting s into p:

$$s = \begin{pmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{pmatrix} \quad (16)$$

$$p = \begin{pmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{pmatrix} \quad (17)$$

$$p = Ts \quad (18)$$

From equations (16) to (18), translation components x, y, and z and orientation conversion components θx, θy, and θz of T are obtained. If all these values are smaller than predetermined thresholds, it is determined that the position and orientation s and the position and orientation p hardly differ from each other and thus match each other. However, if some value is equal to or larger than the predetermined threshold, it is determined that the position and orientation s and the position and orientation p do not match each other.

If the position and orientation matching determination unit 117 determines that these positions and orientations match each other, it sends, to the robot work instruction unit 121, information representing the match and the position and orientation received from the three-dimensional position and orientation measurement unit 116. Instead of the position and orientation received from the three-dimensional position and orientation measurement unit 116, the position and orientation received from the three-dimensional position and orientation measurement unit 113 may be output. Alternatively, the average position and orientation of the position and orientation received from the three-dimensional position and orientation measurement unit 113 and that received from the three-dimensional position and orientation measurement unit 116 may be output. The average position and orientation may be an average obtained by multiplying the respective positions and orientations by weight values. After that, the process advances to step S408.

If the position and orientation matching determination unit 117 determines that these positions and orientations do not match each other, it sends information representing the mismatch to the robot work instruction unit 121. The process then advances to step S411.

Next, a case in which the sensor unit 101 performs measurement once and the sensor unit 102 performs measurement twice or more will be explained. The sensor unit 102 performs measurement twice or more because, if it is determined in step S407 that a mismatch occurs, the process advances to step S411 to change the position and orientation of the robot hand and measure again the target object 103' in steps S405 and S406. Let s be the position and orientation of the target object 103' output from the three-dimensional position and orientation measurement unit 113, and $p(1), p(2), \ldots, p(i)$ be (first, second, . . . , ith) positions and orientations of the target object 103' output from the three-dimensional position and orientation measurement unit 116. Assume that the sensor unit 102 performs measurement ith times.

Matching is determined based on whether at least one of (s, p(1)), (s, p(2)), . . . , (s, p(i)) exhibits a match. The method of determining matching between (s, p(k)) (k=1, . . . , i) is the same as the method used when the sensor unit 101 performs measurement once and the sensor unit 102 performs measurement once. That is, the matching is determined based on whether all the translation components and the position and orientation components in the homogeneous transformation matrix T are smaller than predetermined thresholds.

If the position and orientation matching determination unit 117 determines that these positions and orientations match each other, it sends, to the robot work instruction unit 121, information representing the match and one matching position and orientation out of the positions and orientations (s, p(1)), . . . , (s, p(i)) or the average of them. Thereafter, the process advances to step S408.

It may be determined whether at least two pairs of positions and orientations having a difference smaller than a predetermined amount exists among (s, and p(1), p(2), . . . , p(i)). If such a pair exists, it may be determined that these positions and orientations match each other, and one or the average of them may be set as the position and orientation of the target object. Also in this case, the position and orientation matching determination unit 117 sends the obtained position and orientation to the robot work instruction unit 121. If such a pair of positions and orientations cannot be obtained, the position and orientation matching determination unit 117 determines that the positions and orientations do not match each other.

If the position and orientation matching determination unit 117 determines that the positions and orientations do not match each other, it sends information representing the mismatch to the robot work instruction unit 121. The process then advances to step S411.

In step S408, upon receiving the information representing the match from the position and orientation matching determination unit 117, the robot work instruction unit 121 generates an instruction signal to cause the robot 100 to do work based on the position and orientation received from the position and orientation matching determination unit 117 together with the information. If the robot 100 includes a hand for gripping the target object 103', the robot work instruction unit 121 instructs to grip the target object 103' having this position and orientation. If the robot 100 includes a pad for sucking the target object 103', the robot work instruction unit 121 instructs to suck the target object 103' having this position and orientation.

In step S409, the robot control unit 122 controls the robot 100 to execute instruction contents represented by the instruction signal generated in step S408. When the robot 100 is to grip the target object 103', the robot control unit 122 controls the robot 100 to grip the target object 103'. When the robot 100 is to suck the target object 103', the robot control unit 122 controls the robot 100 to suck the target object 103'.

In step S410, the control unit (not shown) of the image processing unit 110 determines whether an end instruction has been input from an instruction unit (not shown) or the like. If it is determined that an end instruction has been input, the process ends. If no end instruction has been input, the process returns to step S401. Note that the user may press an emergency stop button (not shown) to end the sequence and stop all the operations without waiting for the end determination in step S410. The processing end condition is not limited to a specific condition.

In step S411, if the robot work instruction unit 121 receives the information representing the mismatch, it obtains a new position and orientation different from the current position and orientation of the hand of the robot 100. The robot work instruction unit 121 then generates an instruction signal to move the hand of the robot 100 to the obtained position and orientation, and sends the generated instruction signal to the robot control unit 122. By controlling the robot 100 in accordance with the instruction signal, the robot control unit 122 moves the hand to the new position and orientation. The sensor unit 102 can therefore sense the target object 103' in the new position and orientation.

Instead of the robot work instruction unit 121, the sensor position and orientation decision unit 114 may obtain a new position and orientation and output the obtained position and orientation to the robot work instruction unit 121 to move the hand of the robot 100.

The processing in step S411 is implemented by one of methods (1) to (3) below.

(1) The sensor unit 102 is rotated and moved by a predetermined angle in a direction perpendicular to a plane formed by a straight line connecting the sensor unit 101 with the target object 103', and the optical axis of the camera of the sensor unit 102. By moving the optical axis of the sensor unit 102 off this plane, a feature (for example, an edge) of the target object 103, which could not been observed by the sensor units 101 and 102, becomes able to be observed. As a result, information for making a decision in the next matching determination increases.

(2) The position and orientation of the sensor unit 102 is changed to keep constant the angle formed by a straight line connecting the sensor unit 101 with the target object 103', and the optical axis of the camera of the sensor unit 102. When the straight line connecting the sensor unit 101 with the target object 103' is regarded as a central axis, the orbit of the optical axis of the camera when the sensor unit 102 moves draws (at least part of) a curved plane forming the side surface of a cone. In this case, the level of the sensor unit 102 does not greatly change when viewed from the pallet 104. For this reason, the sensor unit 102 does not collide with the pallet 104 and the surface on which the pallet 104 is placed.

(3) The position and orientation of the sensor unit 102, which is suitable for measurement, may be registered in advance in the three-dimensional geometric model or reference image model. A plurality of positions and orientations may be registered, or the range of the position and orientation may be registered. In this case, a registered position and orientation closest to the current position and orientation of the sensor unit 102 is employed as a new position and orientation.

The sensor unit 102 may be rotated and moved along a plane formed by a straight line connecting the sensor unit 101 with the target object 103', and the optical axis of the camera of the sensor unit 102 by using the target object 103' as a center. Alternatively, the sensor unit 102 may be moved close to or apart from the target object 103' along the optical axis of the camera of the sensor unit 102. Instead, the position and orientation of the sensor unit 102 may be changed at random.

In step S412, the control unit (not shown) of the image processing unit 110 determines whether a count c (counted by the control unit) by which new positions and orientations have been calculated in step S411 (count by which the position and orientation of the hand has been changed) has reached a predetermined count n. If it is determined that c has reached n, the process returns to step S401 to set a position and orientation as a measurement target, except for that of the target object 103'. If c has not reached n, the process returns to step S405.

In an embodiment, before sensing again the target object in step S401, the pallet 104 may be shaken by a shaking unit (not shown) to change the heaped state of the target objects 103. It is also possible to set a target object other than the target object 103' whose position and orientation has been obtained in step S402, return the process to step S405, and perform measurement by the sensor unit 102. When the process returns to step S401, the count c is reset to 0.

As described above, according to the first embodiment, when the result of measurement using the sensor unit 102 differs from an actual position and orientation of a target object, work by the robot based on the erroneous measurement result can be prevented. Since unnecessary processing including gripping and detection of a gripping failure does not occur, work by the robot can be made efficient.

<Modification>

As a modification of the first embodiment, the sensor unit 101 may be a sensor for obtaining three-dimensional information about a target object. For example, the sensor unit 101 may be a distance sensor for measuring distance data representing a distance to a target object.

Furthermore, the sensor unit 102 may be a sensor for obtaining three-dimensional information about a target object. For example, the sensor unit 102 may be a distance sensor for measuring distance data representing a distance to a target object.

In this case, the sensor information acquisition units 111 and 115 acquire distance data from the sensor units 101 and 102, and output the obtained distance data to the three-dimensional position and orientation measurement units 113 and 116, respectively. The three-dimensional position and orientation measurement unit 113 obtains the position and orientation of the target object by associating the distance data output from the sensor information acquisition unit 111 with the point group data of a surface of a three-dimensional geometric model output from the model information holding unit 112. The three-dimensional position and orientation measurement unit 116 obtains the position and orientation of the target object by associating the distance data output from the sensor information acquisition unit 115 with the point group data of the surface of the three-dimensional geometric model output from the model information holding unit 112. The ICP (Iterative Closest Point) method is used to obtain the position and orientation of the target object using the distance data and the model information. The position and orientation of the target object is repeatedly corrected by an iterative operation. Note that the optimization method for obtaining the position and orientation of a target object is not limited the ICP method.

As another modification of the first embodiment, the sensor unit 101 may be a sensor (a combination of a camera and a distance sensor) for obtaining two-dimensional information (a two-dimensional image) and three-dimensional information (distance data) about the target object. The sensor unit 102 may also be a sensor (a combination of a camera and a distance sensor) for obtaining two-dimensional information (a two-dimensional image) and three-dimensional information (distance data) about the target object. The method of simultaneously solving association of the two-dimensional image with the model information and association of the distance data with the model information is well known. For example, a method disclosed in Japanese Patent Laid-Open No. 2011-27623 is applicable.

As still another modification of the first embodiment, the projector of the sensor unit 102 can irradiate the entire surface with uniform-luminance light instead of pattern light. By irradiating the surface with uniform-luminance light, the projector can be handled as a general illuminator. In this case, the projector of the sensor unit 102 irradiates a target object with uniform-luminance light, and two-dimensional information (a two-dimensional image) is acquired by the camera of the sensor unit 102 and output to the sensor information acquisition unit 115. The sensor unit 102 may include an illuminator for illuminating the target object with uniform-brightness light and a camera for sensing a two-dimensional image. The sensor information acquisition unit 115 acquires the two-dimensional image, and outputs it to the three-dimensional position and orientation measurement unit 116. The three-dimensional position and orientation measurement unit 116 measures the position and orientation of the target object by using the two-dimensional image and the model information output from the model information holding unit 112. The method of measuring a position and orientation may be the same as that used by the three-dimensional position and orientation measurement unit 113 (step S402) in the first embodiment.

Second Embodiment

In the first embodiment, matching between a position and orientation obtained by the three-dimensional position and orientation measurement unit 113 and that obtained by the three-dimensional position and orientation measurement unit 116 is determined based on a three-dimensional position and orientation difference. In the second embodiment, the matching is determined based on an association error between geometric features extracted from a three-dimensional geometric model.

The arrangement of a system according to the second embodiment is the same as that in the first embodiment except for the operation of the position and orientation matching determination unit 117. The second embodiment is therefore different from the first embodiment only in step S407 in the flowchart of FIG. 4. Only a difference from the first embodiment will be explained below, and a description of the remaining part, which is the same as that in the first embodiment, will not be repeated.

In step S407, the position and orientation matching determination unit 117 determines matching between positions and orientations by executing one of (a) to (d) listed below. Although edges, points, and surfaces are used as geometric features in (a) to (d), the geometric features are not limited to them.

(a) Case in which Error is Obtained by Edge Association

Based on the position and orientation of a target object 103' obtained by a three-dimensional position and orientation measurement unit 113, and that of the target object 103' obtained by a three-dimensional position and orientation measurement unit 116, three-dimensional geometric models of the target object when viewed from, for example, the position and orientation of a sensor unit 102 are projected to a two-dimensional image. MA is a model projection image based on the position and orientation of the target object 103' obtained by the three-dimensional position and orientation measurement unit 113. MB is a model projection image based on the position and orientation of the target object 103' obtained by the three-dimensional position and orientation measurement unit 116.

A plurality of control points are set on the edge component of the model projection image MA, and the edge component of the model projection image MB is searched for in a direction perpendicular to the edge in the two-dimensional screen. If a corresponding point of the model projection image MB is detected, the number of pixels (error) from the control point to the corresponding point is obtained. For the plurality of control points of the model projection image MA, corresponding points of the model projection image MB are searched for, and the average value of the numbers of pixels (error) from the control points to the corresponding points is obtained. If the average value is smaller than a predetermined value, it can be determined that the error is small. Hence, it can be determined that the position and orientation of the target object 103' obtained by the three-dimensional position and orientation measurement unit 113 and that of the target object 103' obtained by the three-dimensional position and orientation measurement unit 116 match each other. If the average value is equal to or larger than the predetermined value, it can be determined that these positions and orientations do not match each other because the error is large.

(b) Case in which Error is Obtained by Point Group Association

Based on a position and orientation obtained by the three-dimensional position and orientation measurement unit 113, and that obtained by the three-dimensional position and orientation measurement unit 116, respective point group data of surfaces extracted from three-dimensional geometric models are arranged in a work space coordinate system fixed in a space where the pallet is placed. MA' is a point group based on the position and orientation of the target object 103' obtained by the three-dimensional position and orientation measurement unit 113. MB' is a point group model based on the position and orientation of the target object 103' obtained by the three-dimensional position and orientation measurement unit 116.

A distance (error) from a given point of the point group MA' to a nearest point of the point group MB' is obtained. For a plurality of points of the point group MA', nearest points of the point group MB' are similarly searched for, and the average value of the distances (errors) between points is obtained. If the average value is smaller than a predetermined value, it can be determined that the error is small. Thus, it can be determined that the position and orientation of the target object 103' obtained by the three-dimensional position and orientation measurement unit 113 and that of the target object 103' obtained by the three-dimensional position and orientation measurement unit 116 match each other. If the average value is equal to or larger than the predetermined value, it can be determined that these positions and orientations do not match each other because the error is large.

(c) Case in which Error is Obtained by Association of Point Group and Model

An error between point group data of a surface extracted from a three-dimensional geometric model based on the position and orientation of the target object 103' obtained by the three-dimensional position and orientation measurement unit 113, and a three-dimensional geometric model based on the position and orientation of the target object 103' obtained by the three-dimensional position and orientation measurement unit 116 is obtained. MA' is a point group based on the position and orientation of the target object 103' obtained by the three-dimensional position and orientation measurement unit 113. MB" is a three-dimensional geometric model based on the position and orientation of the target object 103' obtained by the three-dimensional position and orientation measurement unit 116.

A distance (error) from a given point of the point group MA' to a nearest surface of the model MB" is obtained. For a plurality of points of the point group MA', the average value of the distances (errors) to the surface of the model MB" is obtained. If the average value is smaller than a predetermined value, it can be determined that the error is small. It can therefore be determined that the position and orientation of the target object 103' obtained by the three-dimensional position and orientation measurement unit 113 and that of the target object 103' obtained by the three-dimensional position and orientation measurement unit 116 match each other. If the average value is equal to or larger than the predetermined value, it can be determined that these positions and orientations do not match each other because the error is large.

The relationship between the point group data and the three-dimensional geometric model may be reversed, as a matter of course. That is, an error between a three-dimensional geometric model based on the position and orientation of the target object 103' obtained by the three-dimensional position and orientation measurement unit 113, and point group data of a surface extracted from a three-dimensional geometric model based on the position and orientation of the target object 103' obtained by the three-dimensional position and orientation measurement unit 116 may be obtained.

(d) Case in which Error is Obtained by Model Association

Based on the position and orientation of the target object 103' obtained by the three-dimensional position and orientation measurement unit 113, and that of the target object 103' obtained by the three-dimensional position and orientation measurement unit 116, three-dimensional geometric models are arranged in a work space coordinate system fixed in a space where the pallet is placed. MA" is a model based on the position and orientation of the target object 103' obtained by the three-dimensional position and orientation measurement unit 113, and MB" is a model based on the position and orientation of the target object 103' obtained by the three-dimensional position and orientation measurement unit 116.

A distance (error) from the center point of a given surface of the model MA" to that of a corresponding surface of the model MB" is obtained. For the center points of a plurality of surfaces of the model MA", corresponding points of the model MB" are similarly searched for, and the average value of the distances (errors) between points is obtained. If the average value is smaller than a predetermined value, it can be determined that the error is small. From this, it can be determined that the position and orientation of the target object 103' obtained by the three-dimensional position and orientation measurement unit 113 and that of the target object 103' obtained by the three-dimensional position and orientation measurement unit 116 match each other. If the average value is equal to or larger than the predetermined value, it can be determined that these positions and orientations do not match each other because the error is large.

Third Embodiment

As a modification of the first embodiment, sensor units 101 and 102 may be formed from a single sensor unit. More specifically, the sensor unit 102 mounted on a robot also functions as the sensor unit 101.

First, the robot is controlled to sense a target object by the sensor unit 102 above a pallet 104 in the first position and orientation. After the sensor unit 102 senses the target object in the first position and orientation and a three-dimensional position and orientation measurement unit 113 measures the position and orientation of the target object, the second position and orientation is then determined. The second position and orientation is obtained as described in the first second embodiment. The robot is controlled to move the sensor unit 102 to the second position and orientation, and a three-dimensional position and orientation measurement unit 116 measures the position and orientation of the target object. After that, matching between the position and orientation of the target object obtained by moving the sensor unit 102 to the first position and orientation and that of the target object obtained by moving the sensor unit 102 to the second position and orientation is determined. The matching determination method and processing after the determination are the same as those described in the first and second embodiments.

When the matching is determined in step S407, if it is determined that a mismatch occurs, the three-dimensional position and orientation measurement unit 113 or 116 may change image processing parameters and obtain again the position and orientation of the target object before moving the sensor unit 102. The image processing parameters to be changed are the edge detection threshold, the density of control points shown in FIG. 5A, the point group density of a surface extracted from a three-dimensional geometric model, and the like. Note that the parameters to be changed are not limited to them. If the image processing parameters are changed and it is determined that a match occurs, the process advances to step S408 without moving the sensor unit 102. This can omit the labor to move the sensor unit 102. If it is determined that a mismatch still remains even after changing the image processing parameters, the process advances to step S411 to move the sensor unit 102.

When the matching is determined in step S407, if it is determined that a mismatch occurs, a warning may be issued so that the user can easily grasp the situation. Further, if it is determined in step S412 that the position and orientation of the hand of the robot has been changed n times, a warning may be issued, and at the same time, the robot system may be stopped without returning to step S401, in order to prompt the user to investigate the cause of the error.

The matching determination in step S407 may be made based on the degree of coincidence between model projection images. Based on the position and orientation of a target object 103' obtained by the three-dimensional position and orientation measurement unit 113, and that of the target object 103' obtained by the three-dimensional position and orientation measurement unit 116, three-dimensional geometric models of the target object when viewed from, for example, the sensor unit 102 in the second position and orientation are projected to a two-dimensional image. MA is a model projection image based on the position and orientation of the target object 103' obtained by the three-dimensional position and orientation measurement unit 113. MB is a model projection image based on the position and orientation of the target object 103' obtained by the three-dimensional position and orientation measurement unit 116. The degree of coincidence can be obtained from the luminance difference of each pixel between the projection images MA and MB. The degree of coincidence is compared with a threshold prepared in advance to determine a match or mismatch.

Position and orientation measurement using a model held in a model information holding unit 112 has been described above. However, another method is conceivable as the position and orientation measurement method. For example, the sensor units 101 and 102 may be formed from stereo cameras, and the position and orientation of a target object may be measured using a stereo measurement technique based on images sensed by the stereo cameras.

Although a robot is used as a configuration for changing the position and orientation of the sensor unit 102 in the above description, the present invention is not limited to this. For example, the sensor unit 102 may be mounted on a mechanism formed from a combination of a linear stage and a rotation stage, and the position and orientation may be changed by controlling the stages. In addition to the robot for operating a target object, a configuration for changing a position and orientation may be adopted.

Although the first to third embodiments have described various arrangements and various modifications, all these arrangements and modifications are embodiments and arrangements other than those described above may be employed.

In the above described embodiments, the position and orientation of a target object is obtained from the result of measurement by a sensor having the first position and orientation (first calculation). A sensor is placed at a second position and orientation different from the first position and orientation, and a position and orientation of the target object is obtained from the result of measurement in the second position (second calculation).

When the position and orientation obtained by the first calculation and that obtained by the second calculation satisfy a predetermined condition, the position and orientation obtained by the second calculation, or a position and orientation calculated from the position and orientation obtained by the first calculation and that obtained by the second calculation is output.

In the first embodiment, the following processing is performed for the first calculation and the second calculation. In the first calculation, a sensed image of a target object and/or distance data representing the distance to the target object is acquired as the first measurement data from the first sensor. An image group obtained when the target object or a virtual object simulating the target object is viewed from a plurality of viewpoints, or the virtual object is set as target object information. The position and orientation of the target object is obtained using the target object information and the first measurement data. In the second calculation, a second sensor is moved to the second position and orientation, and a sensed image of the target object and/or distance data representing the distance to the target object is acquired as the second measurement data from the second sensor. The position and orientation of the target object is obtained using the target object information and the second measurement data.

In a further embodiment, the position and orientation of a target object is obtained by the stereo measurement technique using sensed images of the target object obtained by the first and second sensors serving as stereo cameras in the first calculation and the second calculation.

The "predetermined condition" is preferably "the difference between a position and orientation obtained by the first calculation and that obtained by the second calculation is smaller than a predetermined amount" in the first embodiment. In the second embodiment, the "predetermined condition" is preferably "the difference between a projection image, on a screen, of a virtual object having a position and orientation obtained by the first calculation, and a projection image, on the screen, of a virtual object having a position and orientation obtained by the second calculation is smaller than a predetermined amount".

Fourth Embodiment

The respective units shown in FIG. 1 may be integrated/divided appropriately. For example, the respective units in an image processing unit 110 may be formed from one device, or several components may be formed from one device. The image processing unit 110 and a robot controller unit 120 may be integrated into one device.

The respective units forming the image processing unit 110 may be formed from hardware, but may be formed from software (i.e. a computer program). In this case, the computer program is installed in a memory such as a RAM in the image processing unit 110, and executed by a CPU in the image processing unit 110. Hence, the CPU can implement the functions of the respective units in the image processing unit 110 shown in FIG. 1.

The techniques described in the first to third embodiments (including modifications) may be used in combination, or a partial technique described in one of the embodiments may be incorporated in another embodiment and used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053679, filed Mar. 9, 2012 which is hereby incorporated by reference herein in its entirety.

What is claimed is:

1. An information processing apparatus comprising:
a first calculation unit that calculates a first calculated position and orientation of a target object based on first measurement data obtained from a first sensor in a first position and orientation;
a second calculation unit that calculates a second calculated position and orientation of the target object based on second measurement data obtained from a second sensor, different from the first sensor, in a second position and orientation different from the first position and orientation;
a determination unit that determines whether the first calculated position and orientation calculated by said first calculation unit and the second calculated position and orientation calculated by said second calculation unit match;
an output unit that outputs, if said determination unit determines that the first calculated position and orientation and the second calculated position and orientation match, a position and orientation of the target object based on at least one of the first calculated position and orientation and the second calculated position and orientation; and
a controlling unit that controls the second sensor to move, if said determination unit determines that the first calculated position and orientation and the second calculated position and orientation do not match, to a third position and orientation different from the first position and orientation and the second position and orientation.

2. The apparatus according to claim 1, wherein said first calculation unit is arranged to calculate the first calculated position and orientation based on the first measurement data obtained by the first sensor located at the first position and orientation and said second calculation unit is arranged to calculate the second calculated position and orientation based on the second measurement data obtained by the second sensor moved to the second position and orientation different from the first position and orientation.

3. The apparatus according to claim 1, wherein said control unit further controls to execute, when said determination unit determines that the first calculated position and orientation and the second calculated position and orientation do not match each other, the calculation by said second calculation unit and the determination by said determination unit again.

4. The apparatus according to claim 1, wherein
said first calculation unit is arranged to acquire, as the first measurement data, a sensed image of the target object and/or distance data representing a distance to the target object, and
said second calculation unit is arranged to acquire, as the second measurement data, a sensed image of the target object and/or distance data representing a distance to the target object.

5. The apparatus according to claim 1, further comprising a holding unit that holds model information of the target object,
wherein said first calculation unit calculates the first calculated position and orientation of the target object using the model information and the first measurement data, and
said second calculation unit calculates the second calculated position and orientation of the target object using the second measurement data and the model information.

6. The apparatus according to claim 5, wherein said holding unit is arranged to hold, as the model information, one of a virtual object simulating the target object, and an image group obtained when one of the target object and the virtual object is viewed from a plurality of viewpoints.

7. The apparatus according to claim 1, wherein when a difference between the first calculated position and orientation calculated by said first calculation unit and the second calculated position and orientation calculated by said second calculation unit is smaller than a predetermined amount, said determination unit determines that the first calculated position and orientation calculated by said first calculation unit and the second calculated position and orientation calculated by said second calculation unit match.

8. The apparatus according to claim 1, wherein when a difference between a geometric feature group based on the first calculated position and orientation calculated by said first calculation unit and a geometric feature group based on the second calculated position and orientation calculated by said second calculation unit is smaller than a predetermined amount, said determination unit determines that the first calculated position and orientation calculated by said first calculation unit and the second calculated position and orientation calculated by said second calculation unit match.

9. The apparatus according to claim 1, further comprising a robot control unit that controls work of a robot related to the target object based on the position and orientation of the target object output from said output unit.

10. An information processing method to be performed by an information processing apparatus, comprising:
   a first calculation step of calculating, with a processor of the information processing apparatus, a first calculated position and orientation of a target object based on first measurement data obtained by a first sensor in a first position and orientation;
   a second calculation step of calculating, with the processor of the information processing apparatus, a second calculated position and orientation of the target object based on second measurement data obtained by a second sensor, different from the first sensor, in a second position and orientation different from the first position and orientation;
   a determination step of determining, with the processor of the information processing apparatus, whether the first calculated position and orientation calculated in the first calculation step and the second calculated position and orientation calculated in the second calculation step match; and
   an output step of outputting, when the first calculated position and orientation and the second calculated position and orientation are determined to match, as the position and orientation of the target object, a position and orientation based on at least one of the first calculated position and orientation and the second calculated position and orientation; and
   a controlling step of controlling the second sensor to move, if it is determined that the first calculated position and orientation and the second calculated position and orientation do not match, to a third position and orientation different from the first position and orientation and the second position and orientation.

11. A non-transitory computer-readable storage medium for storing a computer program which upon execution causes a computer to perform the information processing method of a first calculation step of calculating, with a processor of the information processing apparatus, a first calculated position and orientation of a target object based on first measurement data obtained by a first sensor in a first position and orientation; a second calculation step of calculating, with the processor of the information processing apparatus, a second calculated position and orientation of the target object based on second measurement data obtained by a second sensor, different from the first sensor, in a second position and orientation different from the first position and orientation; a determination step of determining, with the processor of the information processing apparatus, whether the first calculated position and orientation calculated in the first calculation step and the second calculated position and orientation calculated in the second calculation step match; and an output step of outputting, when the first calculated position and orientation and the second calculated position and orientation are determined to match, outputting, as the position and orientation of the target object, a position and orientation based on at least one of the first calculated position and orientation and the second calculated position and orientation; and a controlling step of controlling the second sensor to move, if it is determined that the first calculated position and orientation and the second calculated position and orientation do not match, to a third position and orientation different from the first position and orientation and the second position and orientation.

12. An information processing apparatus comprising:
   a first calculation unit that calculates a first calculated position and orientation of a target object based on first measurement data obtained from a sensor in a first position and orientation;
   a second calculation unit that calculates a second calculated position and orientation of the target object based on second measurement data obtained from a sensor in a second position and orientation different from the first position and orientation;
   a determination unit that determines whether the first calculated position and orientation calculated by said first calculation unit and the second calculated position and orientation calculated by said second calculation unit match; and
   an output unit that outputs, if said determination unit determines that the first calculated position and orientation and the second calculated position and orientation match, a position and orientation of the target object based on at least one of the first calculated position and orientation and the second calculated position and orientation,
   wherein the first calculation unit is arranged to calculate the first calculated position and orientation based on the first measurement data obtained from a moveable sensor moved to the first position and orientation and the second calculation unit is arranged to calculate the second calculated position and orientation based on the second measurement data obtained from the moveable sensor moved to the second position and orientation different from the first position and orientation.

13. The apparatus according to claim 12, further comprising an execution control unit that, when said determination unit determines that the first calculated position and orientation and the second calculated position and orientation do not match each other, controls a unit that moves the moveable sensor to change the position and orientation of the moveable sensor and upon moving the moveable sensor executing again the calculation by said second calculation unit and the determination by said determination unit.

14. The apparatus according to claim 13, wherein said execution control unit is further arranged to control a unit to move the moveable sensor to a position on a straight line forming at least a predetermined angle with a straight line passing through a position obtained by said first calculation unit and a position of the movable sensor in the first position and orientation.

15. The apparatus according to claim 13, wherein said execution control unit is further arranged to, if the first calculated position and orientation calculated by said first calculation unit and the second calculated position and orientation calculated by said second calculation unit do not match each other, obtain a position and orientation different from a current position and orientation of the moveable sensor, and move the moveable sensor to the obtained position and orientation.

16. The apparatus according to claim 13, wherein
said second calculation unit is arranged to calculate, each time the moveable sensor is moved, the second calculated position and orientation of the target object based on the second measurement data obtained from the moveable sensor, and
said output unit is further arranged to output, a position and orientation of the target object, from positions and orientations calculated by said second calculation unit, a position and orientation in which a difference from the first calculated position and orientation calculated by said first calculation unit is smaller than a predetermined amount, or an average of the positions and orientations calculated by said second calculation unit.

17. The apparatus according to claim 15, wherein
said second calculation unit is arranged to calculate, every time the moveable sensor is moved, the second calculated position and orientation of the target object based on the second measurement data obtained from the moveable sensor, and
said output unit is further arranged to obtain a plurality of pairs of positions and orientations having a difference smaller than a predetermined amount, from a plurality of positions and orientations calculated by said second calculation unit, and a plurality of positions and orientations calculated by said first calculation unit, and output one or an average of the plurality of pairs of positions and orientations as the position and orientation of the target object.

18. An information processing method comprising:
a first calculation step of calculating a first calculated position and orientation of a target object based on first measurement data obtained from a sensor in a first position and orientation;
a second calculation step of calculating a second calculated position and orientation of the target object based on second measurement data obtained from a sensor in a second position and orientation different from the first position and orientation;
a determination step of determining whether the first calculated position and orientation calculated by the first calculation step and the second calculated position and orientation calculated by the second calculation step match; and
an output step of outputting, if is determined that the first calculated position and orientation and the second calculated position and orientation match in the determination step, a position and orientation of the target object based on at least one of the first calculated position and orientation and the second calculated position and orientation,
wherein the first calculation step calculates the first calculated position and orientation based on the first measurement data obtained from a moveable sensor moved to the first position and orientation and the second calculation step calculates the second calculated position and orientation based on the second measurement data obtained from the moveable sensor moved to the second position and orientation different from the first position and orientation.

19. A non-transitory computer-readable storage medium for storing a computer program which upon execution causes a computer to perform the information processing method of a first calculation step of calculating a first calculated position and orientation of a target object based on first measurement data obtained from a sensor in a first position and orientation; a second calculation step of calculating a second calculated position and orientation of the target object based on second measurement data obtained from a sensor in a second position and orientation different from the first position and orientation; a determination step of determining whether the first calculated position and orientation calculated by the first calculation step and the second calculated position and orientation calculated by the second calculation step match; and an output step of outputting, if is determined that the first calculated position and orientation and the second calculated position and orientation match in the determination step, a position and orientation of the target object based on at least one of the first calculated position and orientation and the second calculated position and orientation, wherein the first calculation step calculates the first calculated position and orientation based on the first measurement data obtained from a moveable sensor moved to the first position and orientation and the second calculation step calculates the second calculated position and orientation based on the second measurement data obtained from the moveable sensor moved to the second position and orientation different from the first position and orientation.

20. The apparatus according to claim 1, wherein a position and orientation of the first sensor are fixed, and a position and orientation of the second sensor are not fixed.

* * * * *